United States Patent [19]

Harclerode et al.

[11] Patent Number: 5,110,836
[45] Date of Patent: May 5, 1992

[54] TIME-EFFICIENT PROCESS FOR MAKING EXPANDED POLYMERIC PRODUCTS WITH MULTIPASS EXPANSION OF POLYSTYRENE BEAD

[75] Inventors: William H. Harclerode, Ewing; John C. Knutsen, Highland Park; Barry J. Pekich, Bridgeton; John V. Wiman, Morristown; John C. Voss, Trenton, all of N.J.

[73] Assignee: BASF Corporation, Parsippany, N.J.

[21] Appl. No.: 618,340

[22] Filed: Nov. 26, 1990

[51] Int. Cl.⁵ .................. C08V 9/22; C08V 9/232; C08V 9/24
[52] U.S. Cl. .......................... 521/58; 264/53; 264/DIG. 7; 264/DIG. 9; 264/DIG. 10; 264/DIG. 15; 521/56; 521/60; 521/142; 521/146; 521/149
[58] Field of Search ............ 521/56, 58, 60, 146, 521/142, 149; 264/53, DIG. 7, DIG. 9, DIG. 10, DIG. 15

[56] References Cited

U.S. PATENT DOCUMENTS

| | | | |
|---|---|---|---|
| 4,418,156 | 11/1983 | Rigler et al. | 521/58 |
| 4,419,458 | 12/1983 | Rigler et al. | 521/58 |
| 4,485,193 | 11/1984 | Rubens | 521/58 |
| 4,585,605 | 4/1986 | Kadota et al. | 521/58 |
| 4,777,000 | 10/1988 | Kuwabara et al. | 521/58 |
| 4,925,606 | 5/1990 | Francis | 521/58 |

*Primary Examiner*—Morton Foelak
*Attorney, Agent, or Firm*—Dennis V. Carmen

[57] ABSTRACT

A method for making low density (0.8–1.1 lb/cu.ft.) expanded polymeric products uses blowing agent in an amount of only from 2 to 4.4 weight percent and aging periods of from 1 to 80 hours after each expansion step. The process uses 2 to 5 expansion steps and a polymer having a particular polydispersity, weight average molecular weight and $M_z:M_n$, this polymer having a greater expandability than conventional polymers. The process requires only about half of the amount of blowing agent currently being used in commerically viable processes for making expanded polystyrene products. The process can be used with or without a molding step.

38 Claims, No Drawings

TIME-EFFICIENT PROCESS FOR MAKING EXPANDED POLYMERIC PRODUCTS WITH MULTIPASS EXPANSION OF POLYSTYRENE BEAD

BACKGROUND OF THE INVENTION

The present invention relates to a process for the manufacture of expanded polymeric polystyrene products. The process of the present invention is directed at a time-efficient method of making expanded polymeric products while simultaneously utilizing a low level of blowing agent for making a low density foam product. This is achieved by using: (1) a very low level of blowing agent, in combination with both (2) multiple premolding expansion steps, as well as (3) a polymer which is highly expandable, in combination with an aging time within a specified time period. The final result is a process which not only utilizes less blowing agent, but also can be made time-efficient, and which can result not only in cost savings, but more importantly, reduced release of environmentally-damaging volatile organic compounds into the atmosphere.

Methods for the production of molded polymeric products have required making an intimate mixture of a polymer and a blowing agent. In commercial operations, this intimate mixture was generally made into solid (relatively "high-density") beads of relatively small size (e.g. beads having a diameter of from about 0.2 to 4 millimeters). The beads were then expanded (via heating the mixture) in order to make the foam. The expansion was usually carried out by heating the beads to a temperature at which a polymer gel formed, resulting in the vaporization of the blowing agent. (The blowing agent must have a boiling temperature below the softening temperature of the polymer.) The vaporization of the blowing agent caused an expansion of the beads to form individual particles of foam. The expansion was generally carried out by using a first expansion step, whereafter the now-expanded particles (referred to as prepuff) were then placed into a mold and again heated, whereby the prepuff further expanded and, because of the confined volume, fused to form a unitary object. Under optimal conditions, the bonds formed between the individual prepuff particles were stronger than the individual particles themselves. That is, upon stressing the finished, molded object enough to cause it to break, the break would occur within the individual "cells", rather than at the junctions of the cells.

Fundamental to the foaming operation is the requirement that the polymer contain a blowing agent. In prior commercial production, steam has been used to heat the beads, the steam causing the blowing agent to vaporize, which vaporization results in the formation of gaseous bubbles within the polymer. These bubbles expand as the temperature increases, resulting in the formation of a foam. Since the vast majority of the volume within the foam is occupied by vapor, rather than polymer, the product formed has a density much lower than that of the unexpanded polymer/blowing agent mixture.

A large fraction of the foamed polystyrene currently being produced has a density of from 0.9 lb./sq.ft. to 1.1 lb./sq.ft. This density of material is generally used for insulation and/or protective packaging end uses. In order to achieve this density, it has been the practice of the commercial manufacturers of such "low-density" foamed polystyrenes to incorporate from about 6 to about 9 weight percent of pentane (the most common blowing agent used today) into the polystyrene polymer.

Beads are formed via a suspension polymerization during or after which pentane is introduced into the beads. These beads are then heated in a single premolding expansion step in which the beads are expanded in volume by a factor of about 40 (i.e. to a density of about 1.0 lb./cu.ft.). The now preexpanded beads are allowed to cool and equilibrate by permitting air to diffuse thereinto, and are then put into a mold where they are again heated, resulting in the further expansion of the preexpanded prepuff, so that the prepuff particles are bonded together.

In the process of the present invention, it has been surprisingly found that the length of time required to adequately "cure" the expanded bead (i.e. before further expansion of the bead) can be significantly reduced in comparison with prior art processes.

U.S. Pat. No. 2,884,386 describes a process for making cellular bodies of organic thermoplastic materials. The process described therein involves making an intimate mixture of a blowing agent with a thermoplastic resin and thereafter expanding the mixture to form a cellular thermoplastic body. The specification refers to the use of cycles of expanding operations that, if used repeatedly, cause further expansion of the prepuff particles made in accordance therewith. However, the '386 patent nowhere provides any general statement as to how many premolding expansion steps should be utilized.

The '386 patent nowhere provides any general description of the amount of blowing agent to be used in the process. However, the '386 patent does state that the preferred primary blowing agent is dichlorodifluoromethane, and the Examples in the '386 patent all utilize only halogenated methanes as the blowing agent. Example 1 of the '386 patent utilizes 2 weight percent dichlorodifluoromethane with eight expansion steps to achieve an undisclosed final product density. Example 2 utilizes 8.11 weight percent dichlorodifluoromethane with nine expansion steps to effect a 150× volumetric increase (the density of the final product was undisclosed). Example 4 utilized 20 volume percent of dichlorodifluoromethane in a three step expansion process, to effect a final product density of 0.938 lb./cu ft. In comparison with the process of the present invention, these examples (as well as the remaining examples of the '386 patent) utilize such a high level of blowing agent (and/or such a high number of expansion steps) that the process of the present invention is not only not suggested, the process of the present invention is also taught away from.

The '386 patent also fails to provide one with the unexpected result of the present invention: i.e. that if one were to use merely from 2 to 4.4 weight percent of a blowing agent, a product of relatively low density (i.e. from 0.8 to about 1.1 lb/cu.ft.) could be produced with only from 2 to 5 expansion steps. The gist of the '386 patent is the generalized notion that multiple expansion steps can be used to effectuate a volumetric increase greater than the theoretical volumetric increase possible from the expansion of the blowing agent alone. As the '386 patent states repeatedly, this increase is brought about allowing a more permeable secondary blowing agent, such as air, to diffuse into the foam whereupon after cooling an additional heating will produce further expansion due to the presence of this secondary blowing agent in further heating/expansion steps Although the process of the present invention certainly utilizes this mechanism of increasing the degree of expansion, the process of the present invention is directed towards a specific area wherein this mechanism is used in addition to other critical process steps, i.e. the use of a low (2–4.4 weight percent) level of blowing agent, in combination with the use of only 2 to 5 expansion steps, as well as the use of a specific polymer type (i.e. a polymer exhibiting three characteristics: (1) a polydispersity of from about 1 to less than 2.5; (2) a weight average molecular weight of from greater than 180,000 to about 300,000; (3) a Mz:Mn of from about 2 to about 4.5; and (4) is branched to from 0 to 5 weight percent). It should be noted that the '386 patent nowhere discloses a polymer having such characteristics.

Furthermore, the process of the present invention isolates a specific area of improvement over the subject matter disclosed in the '386 patent. The process of the present invention relates to the use of beads of thermoplastic polymer which contain only from about 2 weight percent to about 4.4 weight percent of a hydrocarbon blowing agent. It has surprisingly been found that even with such a small amount of the blowing agent, the bead can be expanded to a final density of from about 0.8 to about 1.1 lb./cu. ft., while using only 2 to 5 expansion steps (or 2 to 4 preexpansion steps before the molding step). The '386 patent nowhere achieves such final product densities while utilizing so little blowing agent.

Applicants have discovered that the use of a low amount of blowing agent provides many important advantages, among which are:

(1) a reduction in the amount of blowing agent required, resulting in cost savings;

(2) reduced environmental pollution since less blowing agent (generally a volatile organic compound, i.e. a VOC) is released into the environment both during manufacture and during consumer use;

(3) processing advantages such as:
  (a) a lower shrinkage in the molding step;
  (b) quicker cooling in the molding step, resulting in shorter processing times;
  (c) shorter aging time between the preexpansion steps and between the last preexpansion step and the molding step, resulting in shorter processing times; and
  (d) ability to be easily molded with acceptable fusion and dimensional stability on molding while using a low level of blowing agent.

U.S. Pat. No. 4,839,396 describes a process for making expandable alkenyl aromatic polymer particles. These particles have the ability to use a decreased amount of blowing agent while maintaining the potential to produce a bulk density equivalent to that achieved by particles comprising a greater amount of blowing agent. This is achieved through the use of from 0.005 to 0.5 weight percent of a "density modifier". The '396 patent describes the density modifier as a compound providing thermal stability for the alkenyl aromatic polymer at extrusion and expansion conditions and which is also a liquid plasticizer at expansion conditions. These density modifiers are stated to include octadecyl 3,5-di-tert-butyl-4-hydroxyhydrocinnamate, as well as ethylene bis(oxyethylene)bis(3-tert-butyl-4-hydroxy-5-methylhydrocinnamate).

The specification of the '396 patent states that the "volatile fluid foaming agents" (i.e. the blowing agents) usually are employed in amounts corresponding to from about 5 to about 15 percent of the weight of the total formulation. The only examples in the '396 patent utilize from 8.8 to 10.3 weight percent of the blowing agent These examples show that the amount of the blowing agent was reduced from a level of 10.0–10.3 weight percent down to about 8.8 weight percent (i.e. a reduction of about 12 to 15 percent in the amount of blowing agent used), while achieving the same final density as in the comparative run having the greater amount (i.e. 10.0–10.3 weight percent) of blowing agent present.

The process of the present invention also has as a goal the reduction in the amount of blowing agent used in the manufacture of an expanded polymer. However, relative to the '396 patent, the process of the present invention permits at least as much as twice the percentage reduction in the amount of blowing agent (e.g. most preferably a reduction of from about 6 weight percent to about 3.5 weight percent, which is approximately a 40 percent reduction). The process of the present invention produces this comparatively large reduction in blowing agent via an approach which is different from the approach taken in the '396 patent. This approach is the use of an initially low level of the blowing agent (i.e. a blowing agent level of from 2 to 4.4 weight percent) while simultaneously using multiple preexpansion steps. It should be noted that although the '396 patent suggests the use of multiple preexpansion steps before the molding step, the '396 patent fails to make any connection between the use of low amounts of blowing agent and the use of multiple preexpansion steps, and the '396 patent has a very broad, undirected disclosure of the amount of blowing agent which can be used. Furthermore, the '396 patent suggests the use of only relatively high amounts of blowing agent (i.e. 5 to 15% broadly, with examples limited to from 8.8% to 10.3% by weight).

U.S. Pat. No. 4,520,135 and 4,525,484 (a divisional of the application filed for the '135 patent) are both directed at a polystyrene particles containing a blowing agent, wherein the polystyrene has an improved expandability. More particularly, these polystyrene particles are comprised of a polymer which has a molecular weight of from about 130,000 to about 180,000. The '484 patent describes several methods for making this polymer, i.e. via the use of chain transfer agents, the use of oligomers, or polymerizing in the presence of the blowing agent. The '484 patent states that the resulting polystyrene particles can be expanded by conventional methods (e.g. steam expansion). The '484 patent states that the blowing agent can be present in an amount generally from 3 to 12 weight percent (preferably from 5 to 8 weight percent, and the only example in the '484 patent utilizes approximately 7 weight percent pentane) However, the '484 patent nowhere makes any statement regarding the use of multiple premolding expansion steps. In contrast, the process of the present invention utilizes a polymer which is different from the polymer described in the '484 patent in that it exhibits three characteristics which are different from the polymer described in the '484 patent. Foremost among these differences is the fact that the weight average molecular weight of the polymer used in the process of the present invention is higher than that of the polymer described in the '484 patent. Surprisingly, this higher molecular weight polymer has a degree of expandability at least as high as the polymer described in the '484 patent. In further contrast, the process of the present invention requires the use of from 2 to 4 premolding expansion steps, whereas the '484 patent makes no mention of multiple expansion steps either with or without molding.

U.S. Pat. No. 4,485,193 describes a process for making resilient foam particles and moldings with a "lightly crosslinked" polymer, which could be a styrene polymer. The process entails the use of a volatile fluid foaming agent that has low permeability through the polymer, and the process also uses multiple expansion steps for the production of foams of low density, i.e. suitable for molding. The process described and claimed in the '193 patent requires that the once-expanded particles are subjected to a superatmospheric pressure of at least 3 atmospheres in air, whereafter the now "pressurized" particles are further expanded by heating the particles above the glass transition temperature of the polymer after the particles are returned to a normal atmospheric pressure.

The '193 patent nowhere provides any generalized description of the amount of blowing agent which may be employed in the process described therein. However, of the 43 Samples discussed in the '193 patent: Samples 1-17 contained blowing agent in an amount of from about 20 to about 30 weight percent; Samples 18-21 were foams made "in accord" with the specification of the '193 patent but no data was provided re the amount of blowing agent employed in the making of the foam; Sample 22 was a foam made in accord with the conditions of Sample 2 (and Sample 2 utilized 28.9 weight percent blowing agent); Samples 23-38 contained blowing agent in an amount of from 6.12 to about 7.0 weight percent; Samples 39-41 do not contain any description of the amount of blowing agent, but merely state that blowing agent was permitted to diffuse into the already-formed beads; and Samples 42 and 43 appear to utilize blowing agent in an amount of at least 11 weight percent. In summary, the '193 patent teaches the use of blowing agent in an amount which is considerably higher than the amounts involved in the present invention.

U.S. Pat. No. 3,639,551 describes a cyclic method for producing low-density polystyrene foam beads, wherein the beads are expanded in a plurality of expansion steps. However, the gist of the '551 patent is that in between the expansion steps the now partially-expanded beads are reheated to restore the majority of the "lost volume" (i.e. the volume lost upon the cooling of the beads immediately after they were expanded). This reheating step precedes the next expansion step. By this method, the shrinkage of the beads will be prevented from substantially affecting the ultimate degree of expansion obtained.

The '551 patent nowhere provides any discussion of the quantity of blowing agent to be employed in expanding the beads. The '551 patent has a single example which states that:

1000 pounds of a commercial grade acrylonitrile styrene copolymer beads having low boiling hydrocarbon propellant (pentane) included therein and a diameter between about 1/64 to about 1/32 inch were stored in a hopper and fed into a "Buccaneer" preexpander (available from TRI Manufacturing & Sales Co., Lebanon, Ohio) having an expansion chamber substantially as described above.

The '551 patent nowhere states how much of the low boiling propellant (pentane) was present in the beads.

In stark contrast to the '551 patent, the process of the present invention utilizes a low level of blowing agent (from about 2 to about 4.4 weight percent) in combination with multipass expansion in order to achieve a product having a density of from about 0.8 to 1.1 pounds per cubic foot. The '551 patent nowhere mentions the use of such an unconventionally low amount of blowing agent. The process of the present invention further requires the use of a specific polymer, which polymer the '551 patent nowhere discloses.

U.S. Pat. No. 3,631,133 describes a process for expanding polystyrene beads in order to produce a bead having an exceptionally low density (i.e. 5 kg./cu. meter, or less, which equals approximately 0.3 lb./cu. ft., or less). The method described in the '133 patent is generally described as:

(1) insufflating (i.e. pre-expanding to produce a partly expanded product) polystyrene granules containing blowing agent, the insufflating being carried out with steam at about atmospheric pressure, whereby the granules are partially expanded;
(2) conditioning the partially expanded granules at atmospheric pressure;
(3) subjecting the partially expanded granules (in a confined space) to steam at about 150 g./sq. cm. pressure; and
(4) restoring the expanded granules to atmospheric temperature and pressure.

The gist of the '133 patent is that of using multiple expansion steps in combination with a conditioning step, in order to ultimately produce a low density product. The '133 patent nowhere refers to the quantity of blowing agent to be utilized in the process. Rather, all the specification (including Examples) has to say about the blowing agent is:

The starting material consisting of granules of polystyrene containing (sic) a pentane petroleum fraction as a blowing agent [Col. 2, lines 61-63]

In stark contrast to the '133 patent, the process of the present invention utilizes a low level of blowing agent in combination with multipass expansion in order to achieve a product having a density of from 0.8 to 1.1 pounds per cubic foot. The '133 patent nowhere mentions the use of such an unconventionally low amount of blowing agent. Furthermore, the '133 patent nowhere refers to the characteristics of the polystyrene polymer used therein as providing anything other than a conventional level of expandability.

U.S. Pat. No. 3,598,769 describes a process for expanding polystyrene, this process involving:
(1) subjecting (for a few minutes) polystyrene granules to steam at low pressure;
(2) conditioning the granules for a few hours at about 20° C. to 40° C.;
(3) reheating the expanded granules to about 100° C. with hot air;
(4) then treating the granules with steam for 30 to 40 seconds; followed by
(5) conditioning the granules for 1 to 24 hours.

The objective of the '769 patent is to provide a process for producing beads of polystyrene having an apparent specific mass less than about 7 kg./cu. meter (i.e. a density of about 0.44 lb/cu.ft., or less). The gist of the '769 patent is to provide a very specific process for using two of expansion steps and a conditioning step after each expansion step. Furthermore, the '769 patent is directed at carrying out this process on a continuous conveyor belt.

As with the '133 patent, the '769 patent nowhere describes the amount of blowing agent to be used in the process.

In stark contrast to the '769 patent, the process of the present invention utilizes a low level of blowing agent in combination with multipass expansion in order to achieve a product having a density of from 0.8 to 1.1 pounds per cubic foot. The '769 patent nowhere mentions the use of such an unconventionally low amount of blowing agent. Furthermore, the '769 patent nowhere mentions the use of a polymer having an extraordinary degree of expandability.

U.S. Pat. No. 3,126,432 describes a process for producing super-low density thermoplastic foam, namely polystyrene foam. The process described in the '432 patent involves expanding particles of polystyrene having a vaporizable liquid (butane or pentane) inflating agent therein, and thereafter aging the expanded particles first at atmospheric pressure and thereafter at superatmospheric air pressure (2 to 8 atmospheres) for several hours. This exposure to superatmospheric air pressure has the effect of causing a secondary blowing agent to migrate into the expanded particles. Thereafter, the pressure is released and within five hours the particles are heated in a closed mold. Thus the gist of the '432 patent is to "pump up" the expanded particles by exposing the particles to superatmospheric air, and thereafter carrying out a second expansion step by taking advantage of the relatively high internal pressure within the particles, once they are released from the pressure chamber. The '432 patent nowhere has any general discussion of the amount of blowing agent to be utilized in making polystyrene foams. Of the five examples given in the '432 patent, only Examples I, III, and V provide any information as to the amount of blowing agent used in the process. In each of these Examples, the blowing agent used is pentane, and the pentane is present in an amount of 6% by weight of the polystyrene globules. Thus it is clear that the '432 patent does not teach towards any process which utilizes a blowing agent in an amount less than 6% by weight.

In stark contrast to the '432 patent, the process of the present invention utilizes a low level of blowing agent in combination with multipass expansion in order to achieve a product having a density of from 0.8 to 1.1 pounds per cubic foot. The '432 patent nowhere mentions the use of such an unconventionally low amount of blowing agent. Furthermore, the '462 patent nowhere mentions a polymer exhibiting the properties of the present invention.

U.S. Pat. No. 3,056,753 describes the production of expandable polymeric particles having a foamed polymeric structure. The process described therein involves:

(1) partially expanding the polymeric particles; followed by
(2) crushing the particles; followed by
(3) again partially expanding the particles.

The gist of the '753 patent is to decrease the molding cycle time, whereby molded articles can be removed from the mold after permitting a cooling period of lower duration. Nowhere in the '753 patent is there any mention of the amount of blowing agent to be utilized in the process. In fact, even the seven examples within the '753 patent fail to provide any information as to the amount of blowing agent utilized. In stark contrast to the '753 patent, the process of the present invention utilizes a low level of blowing agent in combination with multipass expansion in order to achieve a product having a density of from 0.8 to 1.1 pounds per cubic foot. The '753 patent nowhere mentions the use of such an unconventionally low amount of blowing agent. Furthermore, the '753 patent nowhere mentions a polymer having the characteristics of the polymer of the present invention.

U.S. Pat. No. 4,721,588 describes a closed circuit process for the production of expanded polystyrene foam. This process comprises the steps of:

(a) pre-expanding raw polystyrene beads containing a blowing agent in a pre-expansion vessel;
(b) storing the beads in one or more closed storage containers to allow the internal pressure within the expanded beads to return to substantially atmospheric pressure;
(c) molding the expanded beads to a desired configuration in a closed mold with steam; and
(d) removing the thus-formed article from the mold and placing such in an aging room, wherein at each stage the blowing agent released from the beads is recovered, separated from any residual steam by means of a condensing system, and introduced into the burner of a steam generator, thereby serving as fuel for the process.

As can be seen from the above description of steps, the gist of the process described in the '588 patent is the recovery of the blowing agent and its re-use as a fuel for the heating step. This produces the dual effects of (1) reducing the amount of volatile organic compounds released into the atmosphere, as well as (2) obtaining a double use for the blowing agent which escapes from the polystyrene during the pre-expansion and molding steps.

The '588 patent also mentions that the blowing agent can be n-pentane, or mixtures of n- and iso-pentane (up to about 25% iso-pentane by weight). The '588 patent also states that the initial blowing agent content of the expandable polystyrene beads can be 4-8 weight percent. However, the '588 patent nowhere states that a low density foamed polystyrene product can be obtained if one utilizes less than 5 weight percent of the blowing agent. In fact, aside from the statement that a blowing agent content of 4-8 weight percent can be used, the '588 patent makes absolutely no mention of actual product densities or an further mention of the amount of blowing agent in any actual composition. Finally, the '588 patent makes no mention of the use of multiple pre-molding expansion steps. Rather, the '588 patent teaches one to simply perform one pre-molding expansion step and to thereafter follow this step with the molding step.

In contrast to the '588 patent, the process of the present invention utilizes a low level of blowing agent in combination with multipass expansion in order to achieve a product having a density of from 0.8 to 1.1 pounds per cubic foot. The '588 patent nowhere mentions the use of the combination of a level of blowing agent less than 5 weight percent with multipass expansion in order to achieve a product density of from 0.8 to 1.1 pounds per cubic foot. Furthermore, the '588 patent nowhere mentions a polymer having the characteristics of the polymer used in the process of the present invention.

In recent years the emissions of volatile organic compounds (i.e. VOC's) have come under increasing scrutiny by the EPA, state and local air quality boards as mandated by the Clean Air Act of 1977. Because hydrocarbon emissions have been shown to contribute to photochemical smog, the expanded polystyrene industry which uses pentane as a blowing agent has come under pressure to limit its use and/or emissions of pentane.

Since the early months of 1990, the inventors' process has enjoyed a high level of commercial success, with sales of at least 2 million dollars of a formulation which has been expanded to 0.8-1.1 lb./cu. ft. only with the inventor's process (which corresponds with sales of approximately 3 million pounds of the formulation), which formulation has a highly-expandable polymer present in an amount of about 96 weight percent, based on the total weight the formulation. Thus there has been a high level of commercial success of both the process as well as the formulation utilized in practicing the process.

For several years BASF Corporation has been involved in the manufacture and sale of a polystyrene product having approximately 6 weight percent pentane therein. This product had a polydispersity of 2.2, a weight average molecular weight of about 190,000, and an Mz:Mn of about 3.5. In stark contrast, the product of the present invention has a polydispersity of from 1 to less than 2, a weight average molecular weight of from about 200,000 to about 300,000, and an Mz:Mn of from about 2 to less than 3.

One polymer which has been commercialized for several years has a polydispersity of about 1.9, a weight average molecular weight of about 190,000, and furthermore, upon analysis, yielded a ratio of $M_z$ to $M_n$ of 3.04. Furthermore, this polymer was produced only in formulations bearing blowing agent in an amount of about 6 weight percent. In contrast, the polymer of the present invention has a combination of characteristics (polydispersity, weight average molecular weight, and $M_z:M_n$) which differs from the aforementioned commercially available polymer. Furthermore, the formulation of the present invention utilizes blowing agent in an amount of only from about 2 weight percent to about 4.4 weight percent.

BRIEF SUMMARY OF THE INVENTION

The process of the present invention pertains to making an expanded polymeric product. The process is carried out by expanding beads in from 2 to 5 expansion steps. The beads are comprised of a blowing agent and a polymer. The blowing agent is homogeneously dispersed in the polymer and the blowing agent may be, in general, hydrocarbons which are gaseous or liquid at standard temperature and pressure, do not dissolve the styrene polymer, and boil below the softening point of the polymer. The blowing agent is preferably at least one member selected from the group consisting of:

pentane (including isomers of pentane such as cyclopentane, neopentane, isopentane, as well as pentane petroleum distillate fractions), methylcyclopentane, propane, butane, isobutane, hexane, isomers of hexane, 2-methyl pentane, 3-methyl pentane, 2,2-dimethylbutane, 2,3-dimethylbutane, cyclohexane, methylcyclohexane, heptane, propylene, 1-butylene, 2-butylene, isobutylene, mixtures of one or more aliphatic hydrocarbons having a molecular weight of at least 42 and a boiling point not higher than 95° C. at 760 millimeters absolute pressure, water, carbon dioxide, ammonium carbonate, and azo compounds that are decomposable to form a gas at a heat-plastifying temperature to which the polymer is brought.

The blowing agent is present in the beads in an amount of from about 2 weight percent to about 4.4 weight percent based on the weight of the beads.

The polymer making up the beads may be one or more polymers produced from at least one of a variety of monomers. The monomer is at least one member selected from the group consisting of:

styrene, derivatives of styrene, vinyltoluene, mono- and polyhalogenated vinyltoluenes which form linear polymers, acrylonitrile, and methyl methacrylate.

The polymer is present in the beads in an amount of from about 93 weight percent to about 98 weight percent based on the weight of the beads. The polymer exhibits the following three characteristics: (1) a polydispersity of from about 1 to less than 2.5; (2) a weight average molecular weight of from greater than about 180,000 to about 300,000; and (3) an Mz:Mn of from about 2 to about 4.5. Furthermore, the polymer is branched to from 0 to less than 5 weight percent.

The expansion steps are carried out in an expander at substantially atmospheric pressure. The expansion steps result in "finally-expanded" beads. The expansion of the polystyrene beads is carried out in a manner so that the finally-expanded beads have a density of from about 0.8 pounds per cubic foot to about 1.1 pounds per cubic foot. After each of the expansion steps, the expanded beads are aged from 1 hour to 80 hours.

The process of the present invention also pertains to a process for making a closed-cell foamed thermoplastic resinous molded object. The process is carried out by preexpanding the beads in from 2 to 4 preexpansion steps, and thereafter carrying out a molding step in which the beads are further expanded and fused into a unitary object In the process in which there is a molding step, the expansion steps which precede the molding step are termed "preexpansion" steps because they precede the molding step. It should be noted that the molding step generally causes at least some further expansion, along with bonding the preexpanded beads to one another (i.e. fusion).

The beads are comprised of a blowing agent and a polymer. Although the blowing agent may generally be as described above, preferably the blowing agent is at least one member selected from the group consisting of:

pentane (including isomers of pentane such as cyclopentane, neopentane, isopentane, as well as pentane petroleum distillate fractions), methylcyclopentane, propane, butane, isobutane, hexane, isomers of hexane, 2-methyl pentane, 3-methyl pentane, 2,2-dimethylbutane, 2,3-dimethylbutane, cyclohexane, methylcyclohexane, heptane, propylene, 1-butylene, 2-butylene, isobutylene, mixtures of one or more aliphatic hydrocarbons having a molecular weight of at least 42 and a boiling point not higher than 95° C. at 760 millimeters absolute pressure, water, carbon dioxide, ammonium carbonate, and azo compounds that are decomposable to form a gas at a heat-plastifying temperature to which the resin is brought.

The blowing agent is present in the beads in an amount of from about 2 weight percent to about 4.4 weight percent based on the weight of the beads.

The polymer making up the beads may be one or more polymers produced from at least one of a variety of monomers. The monomer is at least one member selected from the group consisting of:

styrene, derivatives of styrene, vinyltoluene, mono- and polyhalogenated vinyltoluenes which form linear polymers, acrylonitrile, and methyl methacrylate.

The polymer is present in the beads in an amount of from about 93 weight percent to about 98 weight percent based on the weight of the beads. The polymer exhibits the following three characteristics: (1) a polydispersity of from about 1 to less than 2.5; (2) a weight average molecular weight of from greater than about 180,000 to about 300,000; and (3) an Mz:Mn of from about 2 to about 4.5. Furthermore, the polymer is branched to from 0 to less than 5 weight percent.

The preexpansion steps are carried out in an expander at substantially atmospheric pressure. The completion of the preexpansion steps results in the production of "finally-preexpanded" beads. The finally-preexpanded beads are then molded in order to further expand and fuse the finally-preexpanded beads. Both the preexpansion steps and the molding step are carried out so that a molded foamed object having a density of from about 0.8 to about 1.1 pounds per cubic foot is formed.

It is an object of the present invention to reduce the amount of blowing agent used in the production of low density, closed cell, foamed thermoplastic resinous objects.

It is an object of the present invention to reduce the level of environmental impact (i.e. reduced VOC emissions) in the production of low density, closed cell, foamed thermoplastic resinous objects.

It is an object of the present invention to provide a process which will lower the shrinkage upon molding in the production of closed cell, foamed thermoplastic resinous objects.

It is an object of the present invention to provide a process which results in a lowering of the required cooling times both between expansion (and preexpansion) steps as well as in any molding step which is utilized.

It is an object of the present invention to provide a process for efficiently using a polystyrene polymer having a high degree of expandability.

It is a further object of the present invention to provide a process for utilizing an expandable polystyrene formulation in the production of expanded polystyrene products.

It is a further object of the present invention to provide a process wherein a polystyrene polymer as well as a formulation for making expanded polystyrene products can be utilized with a lesser amount of blowing agent emitted, so that there is less blowing agent emitted into the atmosphere and/or pollution abatement equipment.

It is a further object of the present invention to provide a process for producing expanded polystyrene products while using a formulation having a greater ratio of resin to blowing agent, so that more resin is present per pound of formulation.

It is a further object of the present invention to enable the production of expanded polystyrene products using decreased molding cycle times, as well as decreased shrinkage upon molding, as well as decreased aging times between expansion steps.

It is a further object of the present invention to enable the production of an expanded polystyrene product having decreased susceptibility to damage during processing.

It is a further object of the present invention to enable the production of an expanded polystyrene beads having increased shelf life before the molding step due to a lower rate of loss of blowing agent therefrom.

It is a further object of the present invention to enable a process for making expanded polystyrene products in which there is decreased sensitivity to steam during the expansion and molding steps, thereby permitting a "broader molding range process" with respect to the use of steam in the preexpansion and molding steps and its effect on fusion, cycle time, and dimensional stability upon molding.

It is a further object of the present invention to provide a process for producing expanded polymeric products using low aging periods between expansion steps, while simultaneously using a relatively low amount of blowing agent.

Each of the above objects can further be understood as providing a respective advantage to the process of the present invention. Although the term "polystyrene" is found in the above object statements, these objects should be understood as being applicable to all polymers which may be utilized in the process of the present invention, as well as a preferred applicability to polystyrene.

DETAILED DESCRIPTION OF THE PREFERRED EMBODIMENTS

The process of the present invention involves expanding a substantially solid thermoplastic polymer to form a foam. The expansion of the polymer is effectuated by intimately mixing a blowing agent with the polymer, and thereafter heating the mixture so that the blowing agent vaporizes within the polymer particles, causing the polymer particles to expand during a period in which the polymer is in a softened state. The vaporization of the blowing agent is produced by the application of heat. Likewise, the heat also softens the polymer. Enough heat must be applied to cause the temperature of the polymer to exceed its softening point. The vaporization of the blowing agent within the softened polymer causes the mixture to expand and form a foam. The foam is then allowed to cool, while remaining substantially expanded.

During cooling, the pressure within the foam cells decreases due to cooling and condensing of the blowing agent. This causes gases which can permeate the polymer (e.g. air, steam, etc.) to migrate into the cells, thereby somewhat restoring (i.e. to atmospheric pressure) the relatively low internal pressure within the cells. Although components within the atmosphere (i.e. oxygen, carbon dioxide, nitrogen, etc) are to some degree able to diffuse into the cells, if steam is used as the source of heat for the expansion steps (or the molding step), it generally is the most permeable of the gases diffusing into the cells of the foam. Upon substantial equilibration (i.e. when the pressure within the cells is substantially that of ambient atmospheric pressure) of the foam, the now cooled foam can again be heated, resulting in further expansion of the foam. Thus by utilizing multiple "cycles", or "passes" of such expansion, cooling, and "aging" (i.e. substantial equilibration of pressure), sequential volumetric increases can be achieved.

Optionally, the foam can be further expanded and fused in order to form a molded object. Molding is effectuated by placing preexpanded beads into a mold, closing the mold so that a substantially confined volume is produced, and thereafter further heating the preexpanded beads so that they further expand and substantially fill the volume within the mold and fuse (i.e. bond) to one another.

In the process of the present invention it is an objective to provide a commercially viable process which reduces the emission of volatile organic compounds (VOCs) in comparison with currently viable commercial processes. In part, this objective is achieved by utilizing a lower amount of blowing agent than has been used in prior art commercially viable processes. This is effectuated by using from 2 to 4.4 weight percent of the blowing agent, based on the weight of the polymer.

Any one or more of a wide variety of blowing agents can be utilized in the process of the present invention. These blowing agents includes hydrocarbons which are gaseous or liquid under normal conditions, do not dissolve the styrene polymer, and boil below the softening point of the polymer. Among the blowing agents preferred for use in the process are, for example: pentane (including isomers of pentane such as cyclopentane, neopentane, isopentane, as well as pentane petroleum distillate fractions), methylcyclopentane, propane, butane, isobutane, hexane, isomers of hexane, 2-methyl pentane, 3-methyl pentane, cyclohexane, methylcyclohexane, heptane, propylene, 1-butylene, 2-butylene, isobutylene, and mixtures of one or more aliphatic hydrocarbons having a molecular weight of at least 42 and a boiling point not higher than 95° C. at 760 millimeters absolute pressure. A more preferred group of blowing agents comprises pentane, cyclopentane, neopentane, isopentane, pentane petroleum distillate fractions, propane, butane, isobutane, hexane, cyclohexane, and heptane. Also useful as blowing agents are water, carbon dioxide, ammonium carbonate, and any of a variety of organic azo compounds that are decomposable to form as gas at the heat-plastifying temperature to which the polymer is brought.

The blowing agent may be incorporated into the polymer before, during, or after polymerization. In the process of the present invention, the blowing agent is incorporated into the polymer in an amount of from 2 to 4.4 weight percent, based on the total bead weight. Preferably the blowing agent is incorporated in an amount of from about 2.5 to about 4.4 weight percent, still more preferably from about 3 to about 4, and most preferably the blowing agent is incorporated in an amount of about 3.5 weight percent. Most preferably the blowing agent is pentane (either n-pentane or a mixture of n-pentane together with isomers of pentane). Preferably the pentane is added to the polymer during the polymerization process, most preferably at a styrene conversion of from 20–60%. See Example 1 (infra) for a description of a process for producing a polymer to be utilized in the process of the present invention.

The process of the present invention is carried out on an unexpanded bead. The term "unexpanded bead" is herein defined as a discrete particle which is comprised of a polymer and a blowing agent mixed therewith to a degree of substantial uniformity. According to the process of the present invention, unexpanded beads are expanded in from 2 to 5 expansion steps. A preferred process of the present invention involves carrying out 2 or 3 preexpansion steps, followed by a molding step. That is, from 2 to 3 premolding expansion steps are utilized to produce finally-preexpanded beads. Most preferably this process utilizes only 2 preexpansion steps, followed by a molding step.

If the process is being utilized to make a non-molded product, the preferred process is to use from 2 to 3 expansion steps to produce finally-expanded beads. Most preferably this process utilizes only 2 expansion steps.

If the beads are expanded and not fused into a molded object, the beads are herein termed as "finally expanded beads". If, however, the beads are ultimately to be fused into a molded object, the expansion steps are termed "preexpansion steps". Once these beads are "finally preexpanded", they are thereafter further expanded and fused into a molded object in a molding step which also serves as a final "expansion" step. Regardless of whether the beads are expanded or preexpanded, according to the process of the present invention the total number of expansion (including preexpansion) steps is no greater than 5 and no less than 2. It has surprisingly been found that with as little as from 2 to 4.4 weight percent of blowing agent, a final product density as low as from 0.8 to 1.1 lb/cu.ft. can be obtained. Foams having this density are useful as insulation and/or protective packaging.

The expansion of the beads is typically carried out in a batch expander closed vessel having steam injected thereinto. Examples of such expanders include: Tri 502, Tri 905, Weiser VN400, Kurtz KV1000, Dingledein VA2000. The expansion of the beads is carried out by passing the beads through an expander so that the beads are heated and become soft enough that they expand due to the rising pressure produced by the vaporization of the blowing agent and other internal gases. As a general rule, the rate of passage of the beads through the expander determines the amount of expansion which will result during that expansion step. Of course, the lower the rate of passage of beads through the expander, the greater the amount of heat transferred to the beads, and the higher the resulting degree of expansion produced. However, there is a maximum amount of expansion which any one expansion step can produce for any given bead composition. Thus, it has been found that in general the flow rate of the beads through the expander should be from about 5 pounds per hour per cubic foot of expander volume (i.e. lb/hr./cu.ft.) to about 120 lb/hr/cu.ft. At flow rates below about 5 lb/hr/cu.ft., the beads remain in the expander so long that lumping occurs, and processing time is uneconomical. At flow rates above 120 lb/hr/cu.ft., the beads do not remain in the expander long enough to cause sufficient expansion to result in a process of expanding with a reasonable degree of efficiency. Preferably, the expansion rate is from about 7 to about 100 lb/hr/cu.ft., and most preferably the expansion rate is from about 12 to about 80 lb/hr/cu.ft.

The process of the present invention can be carried out either with or without a molding step. The following is a description of the molding step which can be utilized in the process:

The prepuff (i.e. the preexpanded beads) were placed into a Kurtz vacuum block mold of internal dimensions of approximately 48"×96"×33". The molding steps were as follows: presteaming vacuum to approximately 0.5 bar absolute pressure, followed by steaming into vacuum for approximately 3 seconds, then cross-steaming through the block for about 3-6 seconds, then autoclaving for another 3-8 seconds to a maximum foam pressure of approximately 0.5-1.0 bar. Vacuum was then applied to the block in the mold to assist in cooling the block to a foam pressure of approximately 0-0.1 bar, allowing the block to be removed from the mold without significant post-expansion or shrinkage occurring.

The use of low aging times, as is described herein, enables a greater process effeciency by completing the process within a shorter time period. Furthermore, by using a low level of blowing agent in combination with completing the process within a shorter time period, there is a lower level of emissions of blowing agent into the environment.

In general, the aging time after each first expansion (or first preexpansion) pass is from about 1 hour to about 80 hours. Preferably this aging period is from about 2 hours to about 6 hours, and most preferably this aging period is from about 3 hours to about 4 hours. In general, the aging time after any additional expansion (or additional preexpansion) pass is from about 1 hour to about 80 hours. Preferably this aging period is from 1.2 hours to about 8 hours, and most preferably this aging period is from 1.5 hours to about 2.5 hours.

The polystyrene beads can contain other additives which impart particular properties to the expandable products, such as antistatic agents, stabilizers, colorants, lubricants, fillers, substances which prevent agglomeration during prefoaming, e.g. zinc stearate, melamine-formaldehyde condensates or silica, and agents for reducing the demolding time during final foaming, e.g. glycerol esters or hydroxycarboxylic acid esters. Depending on their intended effect, the additives may be homogeneously dispersed in the particles or be present as a surface coating.

A total of about 0.7 parts (based on 100 parts styrene) of free radical initiators are added to the organic phase at the beginning of the polymerization reaction. Preferably the initiator is a mixture of benzoyl peroxide, dicumyl peroxide, t-butyl perbenzoate. While the benzoyl peroxide acts as a "low temperature" initiator, the t-butyl benzoate acts as a "high temperature" initiator. Furthermore, any excess dicumyl peroxide (which is left after the polymerization reaction is complete) serves as a synergist for flame retardant properties.

The process of the present invention also may optionally utilize poly-n-vinylpyrollidone as a protective colloid which coats the beads. The poly-n-vinylpyrollidone is added at a time during the polymerization reaction when the beads are at the size desired. The poly-n-vinylpyrollidone has the effect of coating the beads so that they cannot adhere to one another, resulting in arresting the growth of the beads, thereby "freezing" their size. The poly-n-vinylpyrollidone is preferably added to the reaction mixture at a level of about 0.3 weight percent, based on the weight of the polymer present.

Generally, the polymers to be used in the process of the present invention may be produced from one or more of any of a wide variety of monomers. Such monomers include monovinyl compounds which undergo addition polymerization to provide generally linear polymers. It is preferred that such polymers are also capable of forming structures crosslinked to a desired degree when polymerized in the presence of a crosslinking quantity of a polyvinyl compound (e.g. ethylene glycol, dimethacrylate, divinylbenzene, etc.). The monovinyl compounds useful in the process are, for example, styrene (and derivatives thereof), vinyltoluene, mono- and polyhalogenated vinyltoluenes which form linear polymers, acrylonitrile, methyl methacrylate, and vinyl toluene.

Most preferably the monomer is at least one member selected from the group consisting of styrene and derivatives of styrene. Polystyrene is the most preferred polymer for the process of the present invention. Although pure polystyrene is the most preferred styrene polymer for use in the present invention, monomers herein termed "derivatives of styrene" which can be polymerized and used in the process of the present invention include:

alpha-methylstyrene, o-methylstyrene, m-methylstyrene, p-methylstyrene, ar-ethylstyrene, ar-vinylxylene, ar-chlorostyrene, and ar-bromostyrene, or solid copolymers of two or more of such alkenyl aromatic compounds with minor amounts of other readily polymerizable olefinic compounds such as divinylbenzene, methylmethacrylate or acrylonitrile, etc.

The process of the present invention requires the use of a polymer which exhibits the following three characteristics: (1) a polydispersity within a given range; (2) a weight average molecular weight within a given range; and (3) an $M_z:M_n$ within a given range. Furthermore, the polymer used in the process of the present invention is herein defined in terms of weight average molecular weight ($M_w$), number average molecular weight ($M_n$), z-average molecular weight ($M_z$). The number average molecular weight is the arithmetic mean value obtained by diving the sum of the molecular weight by the number of molecules. The weight average molecular weight is the second power average molecular weight in the polydisperse polymer. The z-average molecular weight molecular weight is the third power average molecular weight in the polydisperse polymer. More extensive and descriptive definitions of these various molecular weights were described by Billmeyer, F.W., Jr., *Textbook of Polymer Science*, 2nd Ed., 1971, Wiley-Interscience, N.Y., N.Y., pp 6, 66, 78, and 92, which book is herein incorporated by reference.

The inventors of the process of the present invention have unexpectedly discovered that such a polymer can also be used to make a low density (i.e. 0.8-1.1 lb/cu.ft.) foam while using an unexpectedly low amount of blowing agent, if from just two to five expansion steps are utilized in the process.

The process of the present invention utilizes a polymer having a particular set of characteristics, which characteristics are derived from the molecular weight distribution curve of the polymer. The molecular weight distribution curve is determined by gel permeation chromatography. This method is described in detail in G. Glockler, Polymercharakterisierung, Chromatographische Methoden, volume 17, published by Huthig, Heidelberg 1982, which is herein incorporated by reference.

The first of these characteristics, i.e. polydispersity, is determined by analyzing the molecular weight distribution curve for the reaction product of the polymerization. Polydispersity is calculated by dividing the weight average molecular weight by the number average molecular weight. Thus, the polydispersity is a measure of the breadth of the molecular weight distribution. The polymer generaly exhibits a polydispersity of from about 1 to less than 2.5. Preferably, the polymer exhibits a polydispersity of from about 1 to less than 2.0, still more preferably from about 1.5 to less than 2.0, and most preferably the polymer exhibits a polydispersity of from about 1.7 to about 1.98. Example 7 (infra) discribes the method of analysis of the polymeric reaction product, this method providing the means for determintion of weight average molecular weight, number average molecular weight, and z-average molecular weight. Thus this analytical procedure provides the data from which one may then calculate polydispersity, weight average molecular weight, and the $M_z:M_n$ ratio.

The second characteristic which the polymer exhibits (i.e. the weight average molecular weight) is, in general, from greater than about 180,000 to about 300,000. Preferably, the polymer used in the process of the present invention has a weight average molecular weight of from greater than 190,000 to about 250,000. Most preferably, the polymer exhibits a weight average molecular weight of from about 200,000 to about 220,000. As with polydispersity, the weight average molecular is determined the analysis provided in Example 7, infra.

The third characteristic is $M_z:M_n$, i.e. the ratio of the z-average molecular weight to the number average molecular weight. This ratio is related to the steepness of slope of the upper end of the molecular distribution curve. In general, the polymer exhibits an $M_z:M_n$ ratio of from about to 2.5 to about 3.3. Most preferably the polymer exhibits an $M_z:M_n$ ratio of from about 2.7 to about 3.0. As with polysidpersity and weight average molecular weight, the $M_z:M_n$ ratio can be calculated based upon the analytic results obtained from the procedure of Example 7. This procedure, of course, results in obtaining a molecular weight distribution curve. The value for weight average molecular weight, number average molecular weight, and z-average molecular weight can be determined. These values permit the calculation of polydispersity as well as $M_z:M_n$ ratio.

The polymer used in the process of the present invention is a substantially linear polymer, i.e. is a substantially unbranched polymer. In general the polymer has a degree of branching of from 0 to less than 5 weight percent. The phrase "... branched to from 0 to less than 5 weight percent ..." is herein defined as referring to a polymeric chain in which at least 95 percent of the molecular weight of the polymer resides in that portion of the molecule which constitutes the linear chain. For purposes of calculating the weight percent of the polymer which resides in branches (as opposed to the linear portion of the polymer molecule), carbon atoms which are not part of the main polymeric chain are considered to be located on branches, and any atoms which are attached to the branch carbon atoms are likewise considered to be located on the branch portion of the polymer molecule. Non-carbon atoms which are bonded to a carbon atom of the linear polymer backbone (but which themselves do not make up a portion of the backbone) are considered substituents, rather than branches. However, if a substituent atom is bonded directly or indirectly to a second carbon atom wherein the second carbon atom is not part of the linear polymer backbone, the substituent as well as any atoms attached thereto (which are not part of the polymer backbone) are considered to be on a branch. The polymer is preferably branched to about 0 to less than 2 weight percent. Most preferably the polymer is branched to from 0 to less than 1 weight percent.

The polymer is preferably a substantially homopolymeric polystyrene polymer. That is, the polymer is preferably derived for a single monomer, that monomer being styrene. The phrase "substantially homopolymeric polymer" is herein defined as a polymer in which at least 99 percent of the monomeric units (which reacted to form the polystyrene) were a single monomer. Preferably, at least 99.9 percent of the monomeric units which are reacted to form the polymer are a single monomer species.

Preferably the polymer is a substantially unsubstituted polymer. The phrase "substantially unsubstituted polymer" is herein defined as a polymer having a carbon backbone and branches in which less than 2 percent of the available sites for substitution have atoms other than hydrogen thereon. Still more preferably, the degree of substitution is less than 0.5 percent, based on the total number of positions for substitution available on the polymer.

A preferred polymer of the present invention exhibits: (1) a polydispersity of from about 1.5 to less than 2.0; (2) a weight average molecular weight of from greater than 190.000 to about 250,000; and (3) an $M_z:M_n$ of from about to 2.5 to about 3.3. Furthermore, this preferred polymer is branched to from 0 to less than 2 weight percent. Finally, this preferred polymer is a substantially homopolymeric, unsubstituted polymer.

A still more preferred polymer of the present invention exhibits: (1) a polydispersity of from about 1.7 to about 1.98; (2) a weight average molecular weight of greater than about 200,000 to about 220,000; and (3) an $M_z:M_n$ of from about 2.7 to less than about 3.0. Furthermore, this still more preferred polymer is branched to from 0 to less than 1 weight percent. Finally, this still more perferred polymer is a substantially homopolymeric, unsubstituted polymer.

Preferably the formulation of the present invention further comprises a chain transfer agent. Chain transfer agents having a transfer constant K (as defined in Vollmert, Grundriss der Makromolekularen Chemie, published by Springer 1962, pages 52 and 71, which is hereby incorporated by reference) of from 0.1 to 50, preferably from 1 to 30, are used. Examples of suitable chain transfer agents are:

| | |
|---|---|
| n-Dodecyl mercaptan | (K = 19) |
| tert.-Dodecyl mercaptan | (K = 3) |
| n-Butyl mercaptan | (K = 22) |
| tert.-Butyl mercaptan | (K = 3.6) |
| Carbon tetrabromide | (K = 2.2) |
| Pentaphenylethane | (K = 2.0) |

Optionally (but preferably) the process of the present invention utilizes a flame retardant in the mixture of components which makes up the formulation of the expandable beads. In general, the flame retardant is an organic bromine or chlorine flame retardant compound present in an amount of from about 0.2 to about 2 weight percent, based on the weight of the total formulation. More preferably the formulation comprises a brominated hydrocarbon flame retardant in an amount of from about 0.5 to about 1.5 weight percent, based on the weight of the total formulation. Still more preferably the formulation comprises a flame retardant which is at least one member selected from the group consisting of trisdibromo-propylphosphate, hexabromocyclododecane and bis allyl ether of tetrabromo-bisphenol A, wherein the flame retardant is present in an amount of from about 0.6 to about 1.2 weight percent, based on the total weight of the formulation.

Preferably (but optionally) the formulation further comprises a "flame retardant synergist", i.e. one or more compounds which increase the effectiveness of the flame retardant when used in combination therewith. The flame retardant synergist may at least one member selected from the group consisting of dicumyl peroxide and other organic peroxides which have a half-life of one hour at temperatures of from about 110° C. to about 150° C.

The formulation may further comprise additional additives which impart particular properties to the expandable products. Examples include antistatic agents, stabilizers, colorants, lubricants, fillers, substances which prevent agglomeration during prefoaming, e.g. zinc stearate, melamine-formaldehyde condensates or silica, and agents for reducing the demolding time during final foaming, e.g. glycerol esters or hydroxycarboxylic acid esters. Depending on their intended effect, the additives may be homogeneously dispersed in the particles or be present as a surface coating.

The unexpanded beads are of course primarily comprised of one or more polymers having the characteristics described above. Preferably the polymer is polystyrene or polymers produced by polymerizing monomers which are derivatives of polystyrene. In general, the bead is comprised of polymer in an amount of from about 93 to about 98 weight percent, based on total bead weight. Preferably the bead is comprised of polymer in an amount of from about 94 to about 97.5 weight percent. Still more preferably the bead is comprised of polymer in an amount of from about 95 to 97 percent, and most preferably the bead is comprised of polymer in an amount of about 96 weight percent.

If a crosslinking polyvinyl compound is present, it should not be present in an amount which produces an undesirably high amount of crosslinking. This is because the polymer will not undergo expansion if the degree of crosslinking is too high. The crosslinking agents which may be employed in the process of the present invention comprise: divinylbenzene, diethylene glycol dimethacrylate, diisopropenylbenzene, diisopropenyldiphenyl, diallylmaleate, diallylphthalate, allylacrylates, allylmethacrylates, allylfumarates, allyllitaconates, alkyd resin types, butadiene or isoprene polymers, cyclooctadiene, methylene norbornylenes, divinyl phthalates, vinyl isopropenylbenzene, divinyl biphenyl, as well as any other di- or poly-functional compound known to be of use as a crosslinking agent in polymeric vinyl-addition compositions.

EXAMPLE 1

Method of Making Polymer

A mixture of 87 parts of water, 0.16 parts of sodium pyrophosphate, and 0.27 parts of magnesiun sulfate heptahydrate was reacted with stirring at ambient temperature in a stainless steel pressure resistant vessel To this mixture was added a mixture of 100 parts of styrene, 014 parts of benzoyl peroxide, 0.32 parts t-butylperbenzoate, 0.62 parts of hexabromocyclododeane, and 0.21 parts of dicumyl peroxide, with stirring. The vessel was heated for at least 2 hours at a constant rate to 85° C. and then to 115° C. over 4.5 hours. Sixty-five to seventy-five minutes after the vessel reached 80° C., a 10% aqueous solution of polyvilylpyrrolidone was added to the reaction mixture. After an additional 100–120 minutes, a solution of 0.10 parts of chain transfer agent in 4.7 parts of h-pentane was added to the reaction vessel. After reaching 115° C., the vessel was held at constant temperature for 3 hours, whereupon it was cooled to ambient temperature over 3 hours.

EXAMPLE 2

A polystyrene polymer was prepared substantially as described in Example 1. The polymer contained approximately 3.1 percent pentane (blowing agent). The resulting expandable polystyrene beads were analyzed according to the procedure of Example 7, and were found to have contained polymer having a polydispersity of 1.82, a weight average molecular weight of 202,000, and an $M_z:M_n$ of 2.70. The beads were screened to 0.6–1.3 mm diameter, dried to remove surface moisture, and coated with 0.12 weight percent of a mixture of powdered lubricants and antilumping agents commonly used in the industry as screening aids and antilumping agents. The pentane content of the beads out of the polymerization reactor was 3.41 weight percent. However, as was typical, about 0.3 weight percent of pentane was lost during subsequent processing, making 3.1 weight percent the approximate pentane content at the time of expansion.

The coated beads were expanded in a Tri Manufacturing Model 502 expander. The inlet steam temperature was about 211° F., and the inlet steam flow rate was approximately 74 pounds per hour. The first-pass expansion rate was about 208 pounds per hour and the outlet density of the prepuff was about 1.9 pounds per cubic foot. A fluidized bed drier (as commonly used in the industry) was utilized to cool and partially stabilize the resulting prepuff. The fluidized bed dryer was equipped with a blower which fluidized a portion of the beads with ambient air. The prepuff was then pneumatically conveyed to storage bags and aged at ambient temperature and humidity for about 3 hours. Following aging, the prepuff was expanded again in the same expander operated at the same conditions, the result being a prepuff having a density of about 1.10 lb/cu.ft., the expander operating at a throughput of about 217 pounds per hour. The resulting prepuff was again passed through the fluidized bed dryer. After airveying again to storage bags and aging for about three hours, the prepuff was transferred to a Kurtz vacuum block mold (4'×8'×34") and molded. The molding cycle consisted of presteaming vacuum to about 0.5 bar absolute pressure, followed by cross-steaming and autoclaving with steam. The resulting block was then cooled with vacuum until the foam pressure was stabilized. The pressure release time was about 30 seconds, and the resultant block had an average of 10% fusion, 1% shrinkage (defined as actual block length shrinkage 24 hours after molding compared to actual mold length), 1.6% collapse (defined as actual thickness shrinkage in middle of block compared to actual mold thickness), and a bulk density of 1.10 lb/cu.ft. (defined as weight of block divided by actual mold volume).

EXAMPLE 3

This example illustrates the expansion and molding of relatively large polystyrene beads containing 4.4 weight percent pentane. Also shown is the effect of too short an aging time (after the second preexpansion pass but before molding) with respect to pentane materials containing conventional amounts of pentane (approximately 6 weight percent).

An expandable polystyrene bead product containing an average of 4.40 weight percent pentane and a bead diameter of 1.3-1.9 mm was expanded in a Kurtz KV1000 expander equipped with a Kurtz automatic density control system which adjusted inlet steam flow to achieve desired prepuff outlet density. A fluidized-bed dryer was utilized for both expansions. The first-pass expansion was at a rate of 2000 lbs/hr and a density of 1.22-1.25 lb/cu.ft After about two hours age, the prepuff was expanded again, at a rate of 3000 lbs/hr to a density of 0.88-0.90 lb/cu.ft. The prepuff was then molded on a Kurtz vacuum block mold (26"×49.5"×196"). No pre-steam vacuum was used. Stem was added at a pressure of about 0.6 bar for about 6 seconds cross-steam followed by about 10 seconds autoclave. Vacuum was used to cool the block in the mold. After only one hour prepuff aging, the blocks were of poor quality, i.e. poorly fused and deformed (poor dimensional stability). After 3-4 hours prepuff aging, the blocks were molded to 0.7 bar maximum foam pressure and were of excellent quality with a total cycle time of 160-170 seconds. Typical cycle times with normal pentane product after 24-36 hours aging were 300-360 seconds.

EXAMPLE 4

This example illustrates how the use of a 4.4% pentane formulation compares favorably with respect to the use of a conventional formulation. Expansion and molding results, cycle time, fusion, and dimensional stability were acheived with the 4.4% pentane formulation over a conventional 6% pentane formulation.

An expandable polystyrene bead product containing an average of 4.40% pentane and a bead diameter of 0.6-1.3 mm was expanded in a Weiser VN400 expander equipped with a fluidized-bed dryer. The first-pass rate was about 2600 lb/hr at an outlet density of about 1.20 lb/cu.ft. After aging for about four hours, the prepuff was expanded again, at a rate of about 4000 lb/hr and at an outlet density of about 0.79-0.88 lb/cu.ft. After about one hour of aging, the prepuff was molded in a Weiser VacuCompact block mold (196"×49"×31"). Cycle times, fusion, and dimensional stability were equal to or better than that of products of normal (6%) pentane content which had been aged overnight (i.e. over eight hours of aging).

EXAMPLE 5

This example illustrates, among other results, the advantageous performance of a formulation comprising 3.6% pentane. Note the highly desirable low aging time as well as the desirable molding cycle time with accompanying high dimensional stability after molding.

An expandable polystyrene bead product containing an average of 3.58% pentane and a bead diameter of from 0.6-1.3 mm was expanded in a Weiser VN400 expander equipped with fluidized bed drying. The first-pass expansion rate was about 3100 lb/hr at an outlet density of about 1.59 lb/cu.ft. After aging about four hours, the prepuff was expanded again, at a rate of about 3400 lb/h and outlet density of about 0.84-0.86 lb/cu.ft. After about one hour age, the prepuff was molded on a Weiser VacuCompact block mold. Pressure-release (i.e., cooling) time was only 29 seconds. All blocks were well fused and dimensionally stable.

EXAMPLE 6

This example illustrates, among other advantages, how a formulation comprising 3.63 percent pentane permits a highly advantageous molding cycle time, with accompanying 50% increase in productivity in the molding step, due to the lower molding cycle time. Good fusion and dimensional stability are also shown.

An expandable polystyrene bead product containing an average of 3.63% pentane and a bead diameter of from 0.6-1.3 mm was expanded in a Dingledein & Herbert VA-K2000 expander. The first-pass expansion rate was 3000 lb/hr at an outlet density of 1.66-1.75 lb/cu.ft. After aging for about 24 hours, the prepuff was expanded again, at a rate of about 4000 lb/hr and an outlet density of about 0.92-0.94 lb/cu.ft. After aging for about two hours, the prepuff was molded in a 16' Tri Manufacturing block mold. Well-fused, dimensionally stable blocks were produced at a rate of about 15 blocks per hour, as compared to 10 blocks per hour for normal pentane-content beads.

EXAMPLE 7

Molecular Weight Distribution Curve Determination

The following equipment and procedure was utilized in order to generate the molecular weight distribution curve for polystyrene polymers This procedure was utilized to both determine the molecular weight distribution of the polystyrene polymer of the present invention, as well as to analyze products which are herein compared and contrasted with the polymer and formulation of the present invention.

Chromatography Equipment and Conditions

The apparatus consisted of a Waters 6000A pump with a U6K injector, a Viscotek-supplied pulse dampener, two 30 cm PLGel 5 um Mixed Bed polystyrene columns, a Viscotek Model 100 differential visometer (DV) and a Waters R401 differential refractometer (RI). The data acquisition and analysis hardware consisted of an IBM PC AT equipped wit 640 kb RAM, a 30 Mb fixed disk and two 5.25" floppy disk drives; a dot matrix printer and an HP 7475A plotter. The software used was Unical Ver. 3.11 (an ASYST-based package) modified to display $M_{z+1}$ and obtained from Viscotek. The chromatographic conditions were as follows:

| | |
|---|---|
| Nominal flow rate: | 1.0 ml/min |
| Solvent: THF, high purity, non-spectro grade | |
| sample Injection Volume: | 0.100 ml |
| RI Detector: | |
| Attenuation: | 16x |
| Polarity: | + |
| DV Detector: | |
| Temperature: | 31.0 ± 0.1° C. |
| Full Scale Output: | 50 Pa |
| DPT Sensitivity: | 0.2074 |
| Data Acquisition: | |
| Start Time: | 6 min. |
| Stop Time: | 24 min. |

Analytical Procedure

The THF to be used as the mobile phase for the GPC system was filtered through a 0.45 um fritted filter and then degassed under an aspirator vacuum for approximately 45 minutes. The THF and the flask were then transferred to the GPC system and the THF maintained under a pad of helium. Samples were made up to a concentration of 5 mg/ml and filtered through a Gelman Acrodisc CR PTEE 0.45 um filter prior to injection.

Only freshly prepared solutions were used as polymer degradation was apparent with aged solutions. All solutions were analyzed twice. The EPS (expanded polystyrene) samples were not purified by precipitation prior to dissolution and analysis, as comparison of purified and raw EPS polymer results indicated no significant differences. To obtain accurate solution concentrations for the unprecipitated EPS, the initial solution concentrations were corrected for volatiles determined by GC and coulombmetric analysis for pentane and moisture, respectively, or gravimetrically by baking a sample for total volatiles.

To correct for fluctuations in flow rate, each chromatogram was normalized to the flow rate present during calibration. This was accomplished by calculating the ratio of the void volumes (total exclusion volume, earliest negative peak in chromatogram) of the calibration chromatograms to the sample chromatogram. The calibration void volume was determined to be 19.72 ml. The ratio was then entered into the data analysis package as the corrected flow rate.

EXAMPLES 8-15

The procedure of Example 1 was substantially followed in making an polystyrene formulation according to the present invention. This polymer formulation is identified as Example 8 in Table I (infra). The polymer formulation of Example 9 contained a blowing agent (pentane) in an amount of about 3.5 weight percent. The polymer of Example 9 was analyzed according to the procedure set forth in Example 7, and from this analysis the number average molecular weight ($M_n$), the weight average molecular weight ($M_w$), and the z-average molecular weight ($M_z$) were determined. From these values the polydispersity (PD) and the $M_z$:$M_n$ were calculated.

The analytical procedure of Example 7 was also performed for several current commercial products (i.e. Examples 9-14) each of which contained blowing agent in an amount of 5.5 weight percent to at least 7 weight percent. Example 10 had blowing agent therein at a level of approximately 6 weight percent. From this analysis, the same molecular weight determinations were made. Table I (below) provides the results of the analyses for both the formulation of the present invention (Example 9) as well as several commercial formulations currently available.

As can be seen from Table I, only the formulation of the present invention had all three identifying characteristics within the scope of those which are identified as pertaining to the polymer of the present invention. Even though each of these polymers falls within the definition of the polymer utilized in the formulation of the present invention, none of these formulations had the amount of blowing agent required in the formulation of the present invention.

TABLE I

| | POLYMER CHARACTERISTICS | | | | |
|---|---|---|---|---|---|
| EXAMPLE | $M_n \times 10E5$ (g/mol) | $M_w \times 10E5$ (g/mol) | PD | $M_z \times 10E5$ (g/mol) | $M_z$:$M_n$ |
| 8 | 1.12 | 2.02 | 1.82 | 3.00 | 2.70 |
| 9 | 1.12 | 2.17 | 1.95 | 3.35 | 2.99 |
| 10 | 0.87 | 1.93 | 2.20 | 3.11 | 3.56 |
| 11 | 1.37 | 2.89 | 2.10 | 5.28 | 3.84 |
| 12 | 1.20 | 2.51 | 2.09 | 4.58 | 3.81 |
| 13 | 1.01 | 1.89 | 1.88 | 3.07 | 3.04 |
| 14 | 1.13 | 2.20 | 1.94 | 3.83 | 3.37 |

TABLE I-continued

| | POLYMER CHARACTERISTICS | | | | |
|---|---|---|---|---|---|
| EXAMPLE | $M_n \times 10E5$ (g/mol) | $M_w \times 10E5$ (g/mol) | PD | $M_z \times 10E5$ (g/mol) | $M_z$:$M_n$ |
| 15 | 1.27 | 2.73 | 2.15 | 5.03 | 3.96 |

[polydispersity was calculated as $M_w/M_n$, and the ratio of $M_z$ to $M_n$ was calculated by dividing the value obtained for $M_z$ by the value obtained for $M_n$]

EXAMPLES 16-17

These two examples illustrate the difference in both (1) total emissions, as well as (2) emissions during aging, for expanded polystyrene which was produced according to the process described in Example 1. Example 16 illustrates the emissions from a "conventional" process which employs a blowing agent (pentane) in an amount of 6 weight percent. Example 17 illustrates, in contrast, the emissions from a process employing a formulation which comprises only 3.5 weight percent pentane. For Example 16 the amount of blowing agent added during the polymerization was approximately 6 weight percent, whereas for Example 17 only about 3.5 weight percent blowing agent was added during the polymerization. Table II (infra) provides the results of emissions during each of the expansion steps for each Example, for each aging period for each Example, and during the molding step for each Example. The bottom row of Table II provides figures for the total emissions during the entire process of expansion, aging and molding.

As can be seen from the figures in Table II, the polystyrene having the low initial level of blowing agent (i.e. Example 17) exhibited a total emissions of only from 42 to 79 percent as much as for Example 16. Furthermore, the total emissions during aging was only from about 17 percent to about 48 percent for Example 17 as compared with Example 16. Accordingly the formulation (and polymer) of the present invention exhibit a substantial reduction in both the total emissions as well as the emissions during aging.

TABLE II

| | Example 17 | Example 16 |
|---|---|---|
| blowing agent content percent | 6 wt. percent | 3.5 wt. |
| 1st Pass Expansion | .76 | .45 |
| 1st pass aging emissions | 2.0 | .12 |
| 1st pass aging time | 24 hours | 4 hours |
| 2nd pass Expansion | N/A | .07 |
| 2nd pass aging emissions | N/A | .22 |
| 2nd pass aging time | N/A | (2 hours) |
| molding emissions | 0.6-1.1 | 0.76% |
| Total Emissions | 3.36-3.86% | 1.62% |

EXAMPLE 18

Method of Determining and Calculating the Degree of Branching

Branching can be determined using a Viscotek differential viscometer and related software according to the theory of Zimm and Stockmayer. More extensive and descriptive discussions of this theory, as well as related subject matter, can be found in Billmeyer, F.W., Jr., *Textbook of Polymer Science*, 2nd Ed., 1971, Wiley-Interscience, N.Y., N.Y., especially pages 89-90, which is herein incorporated by reference. Using the Mark-Houwink constants for known linear samples of polystyrene, one can calculate the branching frequency of the number of branches per 100 monomer units. More extensive and descriptive discussions of these constants, as well as related subject matter, can be found in Billmeyer, F.W., Jr., *Textbook of Polymer Science*, 2nd Ed., 1971, Wiley-Interscience, N.Y., N.Y., especially pages 86–87, which are herein incorporated by reference.

We claim:

1. A process for making an expanded polymeric product, the process comprising:
   A. expanding unexpanded beads in a first expansion step, the beads being comprised of:
      i. a blowing agent which is at least one member selected from the group consisting of:
         pentane, cyclopentane, methylcyclopentane, neopentane, isopentane, pentane petroleum distillate fractions, propane, butane, isobutane, hexane, isomers of hexane, methylcyclopentane, cyclohexane, heptane, propylene, 1-butylene, 2-butylene, isobutylene, mixtures of one or more aliphatic hydrocarbons having a molecular weight of at least 42 and a boiling point not higher than 95° C. at 760 millimeters absolute pressure, water, carbon dioxide, ammonium carbonate, and azo compounds that are decomposable to form a gas at a heat-plastifying temperature to which the polymer is brought,
      the blowing agent being present in the beads in an amount of from about 2 weight percent to about 4.4 weight percent based on the weight of the beads; and
      ii. a polymer produced from at least one monomer, wherein the monomer is at least one member selected from the group consisting of:
         styrene and derivatives of styrene, vinyltoluene, mono- and polyhalogenated vinyltoluenes which form linear polymers, phenyl ether, acrylonitrile, and methyl methacrylate,
      the polymer being present in the beads in an amount of from about 93 weight percent to about 98 weight percent based on the weight of the beads, the polymer exhibiting:
         (a) a polydispersity of from about 1 to less than 2.5,
         (b) a weight average molecular weight of greater than about 180,000 to about 300,000, and
         (c) an $M_z:M_n$ of from aboout 2 to aboout 4.5; and
      wherein the polymer is branched to from 0 to less than 5 weight percent, and
   B. aging the expanded beads for a time period of from about 1 hour to about 80 hours after the first expansion step;
   C. carrying out from 1 to 3 additional expansion steps with an aging period of from about 1 hour to about 80 hours between each of the additional expansion steps, whereby finally-expanded beads are produced upon completion of the expansion steps, the expansion steps being carried out so that the finally-expanded beads have a density of from about 0.8 pounds per cubic foot to about 1.1 pounds per cubic foot.

2. A method as described in claim 1 wherein the blowing agent is at least one member selected from the group consisting of pentane, cyclopentane, methylcyclopentane, neopentane, isopentane, pentane petroleum distillate fractions, propane, butane, isobutane, hexane, isomers of hexane, cyclohexane, methylcyclohexane, heptane, propylene, butylene, isobutylene, mixtures of one or more aliphatic hydrocarbons having a molecular weight of at least 42 and a boiling point not higher than 95° C. at 760 millimeters absolute pressure, water, carbon dioxide, and ammonium carbonate.

3. A method as described in claim 1 wherein the blowing agent is at least one member selected from the group consisting of pentane, cyclopentane, neopentane, isopentane, pentane petroleum distillate fractions, propane, butane, isobutane, isobutylene, hexane, cyclohexane, methylcyclohexane and heptane.

4. A method as described in claim 1 wherein the blowing agent is present in the unexpanded beads in an amount of from about 2.5 weight percent to about 4.4 weight percent.

5. A method as described in claim 1 wherein the blowing agent is present in an amount of from about 3 weight percent to about 4 weight percent.

6. A method as described in claim 1 wherein the blowing agent is present in an amount of about 3.5 weight percent.

7. A method as described in claim 1 wherein the polymer comprises from about 94 to about 97.5 weight percent of the weight of the beads.

8. A method as described in claim 1 wherein the polymer comprises from about 95 to about 97 weight percent of the weight of the beads.

9. A method as described in claim 1 wherein the polymer comprises from about 96 weight percent of the weight of the beads.

10. A method as described in claim 1 wherein from 2 to 3 expansion steps are utilized to produce the expanded beads.

11. A method as described in claim 1 wherein 2 expansion steps are utilized to produce the expanded beads.

12. A method as described in claim 1 wherein the flow rate of the beads through the expander is from about 5 lb/hr/cu.ft. to about 120 lb/hr/cu.ft.

13. A method as described in claim 1 wherein the flow rate of the beads through the expander is from 7 lb/hr/cu.ft. to about 100 lb/hr/cu.ft.

14. A method as described in claim 1 wherein the flow rate of the beads through the expander is from about 12 to about 80 lb/hr/cu.ft 15. A method as described by claim 1 wherein the expansion steps are carried out by exposing the beads to steam.

16. A method as described by claim 1 wherein the steam has been heated to a temperature of from about 200° F. to about 220° F. upon entering the expander.

17. A process as described in claim 1 wherein the polydispersity is from about 1.0 to less than 2.0.

18. A process as described in claim 1 wherein the polydispersity is from about 1.5 to less than 2.0.

19. A process as described in claim 1 wherein the polydispersity is from about 1.7 to about 1.98.

20. A process as described in claim 1 wherein the weight average molecular weight is from greater than about 190,000 to about 250,000.

21. A process as described in claim 1 wherein the weight average molecular weight is from about 200,000 to about 220,000.

22. A process as described in claim 1 wherein the $M_z:M_n$ is from about 2.5 to about 3.3.

23. A process as described in claim 1 wherein the $M_z:M_n$ is from about 2.7 to about 3.0.

24. A process as described in claim 1 wherein the polystyrene polymer is branched to from 0 to about 2 weight percent.

25. A process as described in claim 1 wherein the polystyrene polymer is branched to from 0 to about 1 weight percent.

26. A process as described in claim 1 wherein the polystyrene polymer is substantially homopolymeric.

27. A process as described in claim 1 wherein the polystyrene polymer is substantially unsubstituted.

28. A process as described in claim 1 wherein the formulation further comprises a chain transfer agent.

29. A process as described in claim 1 wherein the formulation further comprises a flame retardant which is an organic bromine or chlorine flame retardant compound present in an amount of from about 0.2 to about 2 weight percent, based on the weight of the total formulation.

30. A process as described in claim 1 wherein the formulation further comprises a flame retardant consisting of a brominated hydrocarbon flame retardant being, the flame retardant being present in an amount of from about 0.5 to about 1.5 weight percent, based on the weight of the total formulation.

31. A process as described in claim 1 wherein the flame retardant is at least one member selected from the group consisting of trisdibromopropyl phosphate, hexabromocyclododecane and bis allyl ether of tetrabromobis-phenol A, the flame retardant being present in an amount of from about 0.6 to about 1.2 weight percent, based on the total weight of the formulation.

32. A process as described in claim 1 wherein the formulation further comprises a flame retardant synergist which is at least one member selected from the group consisting of dicumyl peroxide and other organic peroxides which have a half-life of one hour at temperatures of from about 110° C. to about 150° C.

33. A process as described in claim 1 wherein the aging time after the first expansion step is from about 2 hours to about 6 hours.

34. A process as described in claim 1 wherein the aging time after the first expansion step is from about 3 hours to about 4 hours.

35. A process as described in claim 1 wherein the aging time between the additional expansion steps is from about 1.2 hours to about 6 hours.

36. A process as described in claim 1 wherein the aging time between the additional expansion steps is from about 1.5 hours to about 2.5 hours.

37. A process for making an expanded polystyrene product, the process comprising the steps of:
A. expanding unexpanded beads in a first expansion step which is carried out in an expander at substantially atmospheric pressure, the beads being comprised of:
  1. a blowing agent which is at least one member selected from the group consisting of:
  pentane, cyclopentane, methylcyclopentane, neopentane, isopentane, pentane petroleum distillate fractions, propane, butane, isobutane, hexane, isomers of hexane, cyclohexane, methylcyclohexane, heptane, propylene, butylene, isobutylene, mixtures of one or more aliphatic hydrocarbons having a molecular weight of at least 42 and a boiling point not higher than 95° C. at 760 millimeters absolute pressure, water, carbon dioxide, and ammonium carbonate,
  the blowing agent being present in the unexpanded beads in an amount of from about 3 weight percent to about 4 weight percent based on the weight of the beads; and
  2. a polymer produced from at least one monomer, wherein the monomer is at least one member selected from the group consisting of styrene and derivatives of styrene, the polymer being present in the beads in an amount of from about 94.6 weight percent to about 97 weight percent based on the weight of the beads, the polymer exhibiting:
    (a) a polydispersity of from about 1.5 to about 2.0,
    (b) a weight average molecular weight of greater than about 190,000 to about 250,000, and
    (c) an $M_z:M_n$ of from about 2.5 to about 3.3, wherein the polystyrene polymer is branched to from 0 to less than 2 weight percent, and
B. aging the expanded beads for a time period of from about 2 hour to about 6 hours after the first expansion step;
C. carrying out from 1 to 2 additional expansion steps in an expander at substantially atmospheric pressure, the additional expansion steps being carried out with an aging period of from about 1.2 hours to about 6 hours between each of the additional expansion steps, whereby finally-expanded beads are produced upon completion of the expansion steps, the expansion steps being carried out so that the finally-expanded beads have a density of from about 0.8 pounds per cubic foot to about 1.1 pounds per cubic foot.

38. A process for making an expanded polystyrene product, the process comprising the steps of:
A. expanding unexpanded beads in a first expansion step which is carried out in an expander at substantially atmospheric pressure, the beads being comprised of:
  i. a blowing agent which is at least one member selected from the group consisting of n-pentane and isomers of pentane the blowing agent being present in the unexpanded beads in an amount of about 3.5 weight percent, based on the weight of the beads; and
  ii. a polymer produced from at least one monomer, wherein the monomer is at least one member selected from the group consisting of styrene and derivatives of styrene, the polymer being present in the beads in an amount of from about 96 weight percent based on the weight of the beads, the polymer exhibiting:
    (a) a polydispersity of from about 1.7 to about 1.98,
    (b) a weight average molecular weight of greater than about 200,000 to about 220,000, and
    (c) an $M_z:M_n$ of from about 2.7 to about 3.0, wherein the polystyrene polymer is branched to from 0 to less than 1 weight percent, and
B. aging the expanded beads for a time period of from about 3 hours to about 4 hours after the first expansion step;
C. carrying out 1 additional expansion step in an expander at substantially atmospheric pressure, the additional expansion steps being carried out with an aging period of from about 1.5 hours to about 2.5 hours between each of the additional expansion steps, whereby finally-expanded beads are produced upon completion of the expansion steps, the expansion steps being carried out so that the finally-expanded beads have a density of from about 0.8 pounds per cubic foot to about 1.1 pounds per cubic foot.

* * * * *